United States Patent
Choudhury et al.

(10) Patent No.: US 12,273,041 B2
(45) Date of Patent: Apr. 8, 2025

(54) BIDIRECTIONAL DC-DC CONVERTER WITH HIGH CONTROL STABILITY

(71) Applicant: Hitachi, Ltd., Tokyo (JP)

(72) Inventors: Abhijit Choudhury, Tokyo (JP); Akihiko Kanouda, Tokyo (JP)

(73) Assignee: Hitachi, Ltd., Tokyo (JP)

(*) Notice: Subject to any disclaimer, the term of this patent is extended or adjusted under 35 U.S.C. 154(b) by 219 days.

(21) Appl. No.: 18/017,965

(22) PCT Filed: Jun. 2, 2021

(86) PCT No.: PCT/JP2021/021074
§ 371 (c)(1),
(2) Date: Jan. 25, 2023

(87) PCT Pub. No.: WO2022/034728
PCT Pub. Date: Feb. 17, 2022

(65) Prior Publication Data
US 2024/0039416 A1 Feb. 1, 2024

(30) Foreign Application Priority Data
Aug. 13, 2020 (JP) ................................ 2020-136815

(51) Int. Cl.
H02M 3/335 (2006.01)
H02M 3/00 (2006.01)

(52) U.S. Cl.
CPC ......... H02M 3/33584 (2013.01); H02M 3/01 (2021.05); H02M 3/33573 (2021.05)

(58) Field of Classification Search
CPC . H02M 3/33584; H02M 3/33573; H02M 3/01
See application file for complete search history.

(56) References Cited

U.S. PATENT DOCUMENTS 9,270,189 B2* 2/2016 Rosado ............ H02M 3/33584
9,847,727 B1* 12/2017 Chen ................ H02M 3/33507
(Continued)

FOREIGN PATENT DOCUMENTS

CN 110868074 A 3/2020
JP 2012-70491 4/2012
(Continued)

OTHER PUBLICATIONS https://dav.uspto.gov/webapp/applicationViewer.html?casenumber=18017965.*
(Continued)

*Primary Examiner* — Rafael O De Leon Domenech
(74) *Attorney, Agent, or Firm* — Crowell & Moring LLP

(57) ABSTRACT

This bidirectional DC-DC converter comprises: a transformer; a first bridge circuit for converting DC power and AC power to each other which are input and output between a first DC power supply and the primary side of the transformer; a second bridge circuit for converting DC power and AC power to each other which are input and output between a second DC power supply and the secondary side of the transformer; a first resonant circuit connectable between the first bridge circuit and the primary side of the transformer; a second resonant circuit connectable between the second bridge circuit and the secondary side of the transformer; a first bypass switch for switching the connection state of the first resonant circuit between the first bridge circuit and the primary side of the transformer; a second bypass switch for switching the connection state of the second resonant circuit between the second bridge circuit and the secondary side of the transformer; and a control unit for controlling each of the first bypass switch and the second bypass switch.

18 Claims, 10 Drawing Sheets

(56) References Cited

U.S. PATENT DOCUMENTS

| | | | |
|---|---|---|---|
| 10,958,098 B1* | 3/2021 | Li | H02J 9/062 |
| 2015/0381064 A1 | 12/2015 | Matsubara et al. | |
| 2016/0285374 A1* | 9/2016 | Agamy | H02J 7/34 |
| 2017/0104365 A1* | 4/2017 | Ghosh | H02J 9/061 |
| 2019/0089260 A1 | 3/2019 | Boysen | |
| 2019/0372471 A1 | 12/2019 | Peng et al. | |

FOREIGN PATENT DOCUMENTS

| | | | |
|---|---|---|---|
| JP | 2014-79108 A | 5/2014 | |
| WO | WO 2015/004989 A1 | 1/2015 | |
| WO | WO 2017/134232 A1 | 8/2017 | |
| WO | WO-2018149295 A1 * | 8/2018 | H02M 3/33584 |

OTHER PUBLICATIONS

International Search Report (PCT/ISA/210) issued in PCT Application No. PCT/JP2021/021074 dated Jul. 20, 2021 with English translation (four (4) pages).

Japanese-language Written Opinion (PCT/ISA/237) issued in PCT Application No. PCT/JP2021/021074 dated Jul. 20, 2021 (three (3) pages).

Extended European Search Report issued in European Application No. 21855807.0 dated Jun. 18, 2024 (8 pages).

* cited by examiner

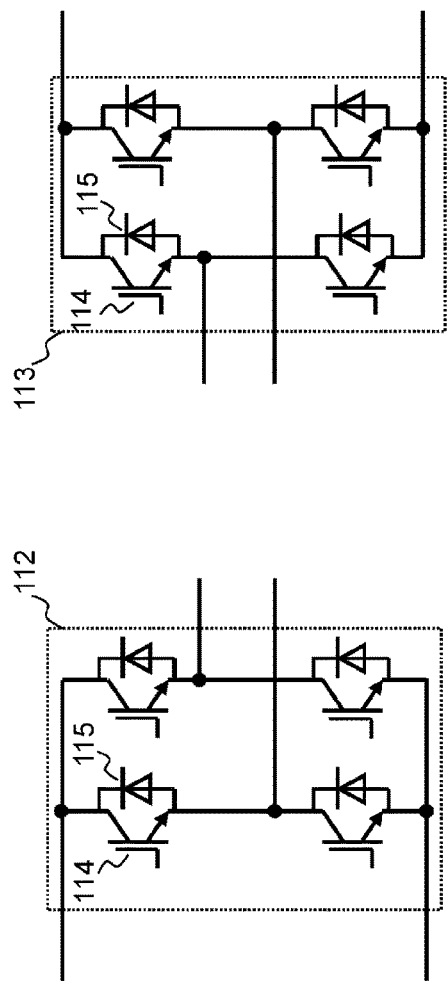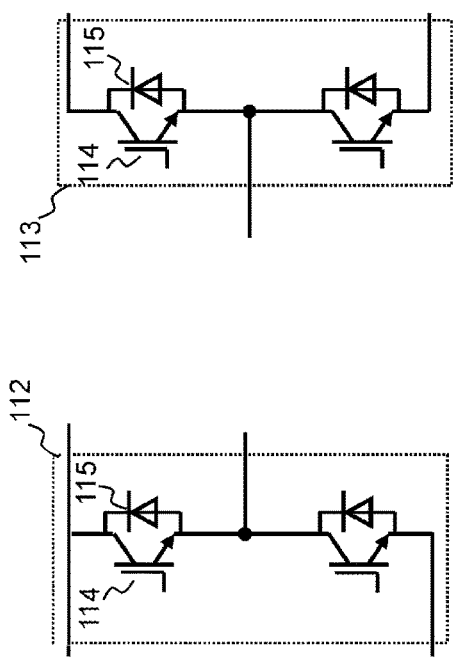
FIG. 2A
FIG. 2B

FIG. 3

| SIGNAL 132 | SIGNAL 133 | CONNECTION STATE OF $S_1$ | CONNECTION STATE OF $S_2$ | MODE |
|---|---|---|---|---|
| 0(Low) | 1(High) | OPENED | CONDUCTED | MODE 1: FORWARD DIRECTION (FWD) |
| 1(High) | 0(Low) | CONDUCTED | OPENED | MODE 2: REVERSE DIRECTION (RD) |

201 — SIGNAL 132
202 — SIGNAL 133
203 — CONNECTION STATE OF $S_1$
204 — CONNECTION STATE OF $S_2$
205 — MODE

FIG. 8

| SIGNAL 132 | SIGNAL 133 | CONNECTION STATE OF S₁ | CONNECTION STATE OF S₂ | MODE |
|---|---|---|---|---|
| 0(Low) | 1(High) | 118 | 302 | MODE 1: FORWARD DIRECTION (FWD) |
| 1(High) | 0(Low) | 301 | 119 | MODE 2: REVERSE DIRECTION (RD) |

BIDIRECTIONAL DC-DC CONVERTER WITH HIGH CONTROL STABILITY

TECHNICAL FIELD

The present invention relates to a bidirectional DC-DC converter that converts DC power bidirectionally which are input and output between two DC power supplies.

BACKGROUND ART

In recent years, with the rapid expansion of the electric vehicle market, bidirectional storage battery chargers have been generalized. A dual active bridge (DAB) type or a resonant type DC-DC converter is mainly used as such a storage battery charger. The resonant type DC-DC converter has higher efficiency than the DAB type, and a transformer current has a sinusoidal shape, so that it is possible to reduce stress on the device and electromagnetic noise. For example, PTL 1 discloses a bidirectional resonant type DC-DC converter including LC resonant circuits on a primary side and a secondary side of a transformer, respectively.

CITATION LIST

Patent Literature

PTL 1: US 2019/0372471 A

SUMMARY OF INVENTION

Technical Problem

In the conventional bidirectional DC-DC converter described in PTL 1, the gain of an output voltage changes non-linearly. Accordingly, there is a problem that the range of the output voltage is limited and the control stability is low.

Solution to Problem

A bidirectional DC-DC converter according to the present invention is a DC-DC converter capable of converting DC power bidirectionally between a first DC power supply and a second DC power supply. The bidirectional DC-DC converter includes: a transformer; a first bridge circuit for converting DC power and AC power to each other which are input and output between the first DC power supply and a primary side of the transformer; a second bridge circuit for converting DC power and AC power to each other which are input and output between the second DC power supply and a secondary side of the transformer; a first resonant circuit connectable between the first bridge circuit and the primary side of the transformer; a second resonant circuit connectable between the second bridge circuit and the secondary side of the transformer; a first bypass switch for switching a connection state of the first resonant circuit between the first bridge circuit and the primary side of the transformer; a second bypass switch for switching a connection state of the second resonant circuit between the second bridge circuit and the secondary side of the transformer; and a control unit for controlling each of the first bypass switch and the second bypass switch.

Advantageous Effects of Invention

According to the present invention, the range of the output voltage is improved, so that a bidirectional DC-DC converter having high control stability can be provided.

BRIEF DESCRIPTION OF DRAWINGS

FIGS. 2A and 2B are diagrams illustrating a configuration example of bridge circuits.

FIG. 3 is a table illustrating switching states of bypass switches controlled by the control unit in the bidirectional DC-DC converter according to the first embodiment of the present invention.

FIG. 8 is a table illustrating switching states of bypass switches controlled by a control unit in the bidirectional DC-DC converter according to the second embodiment of the present invention.

DESCRIPTION OF EMBODIMENTS

Hereinafter, embodiments of the present invention will be described.

First Embodiment

Figure 1:
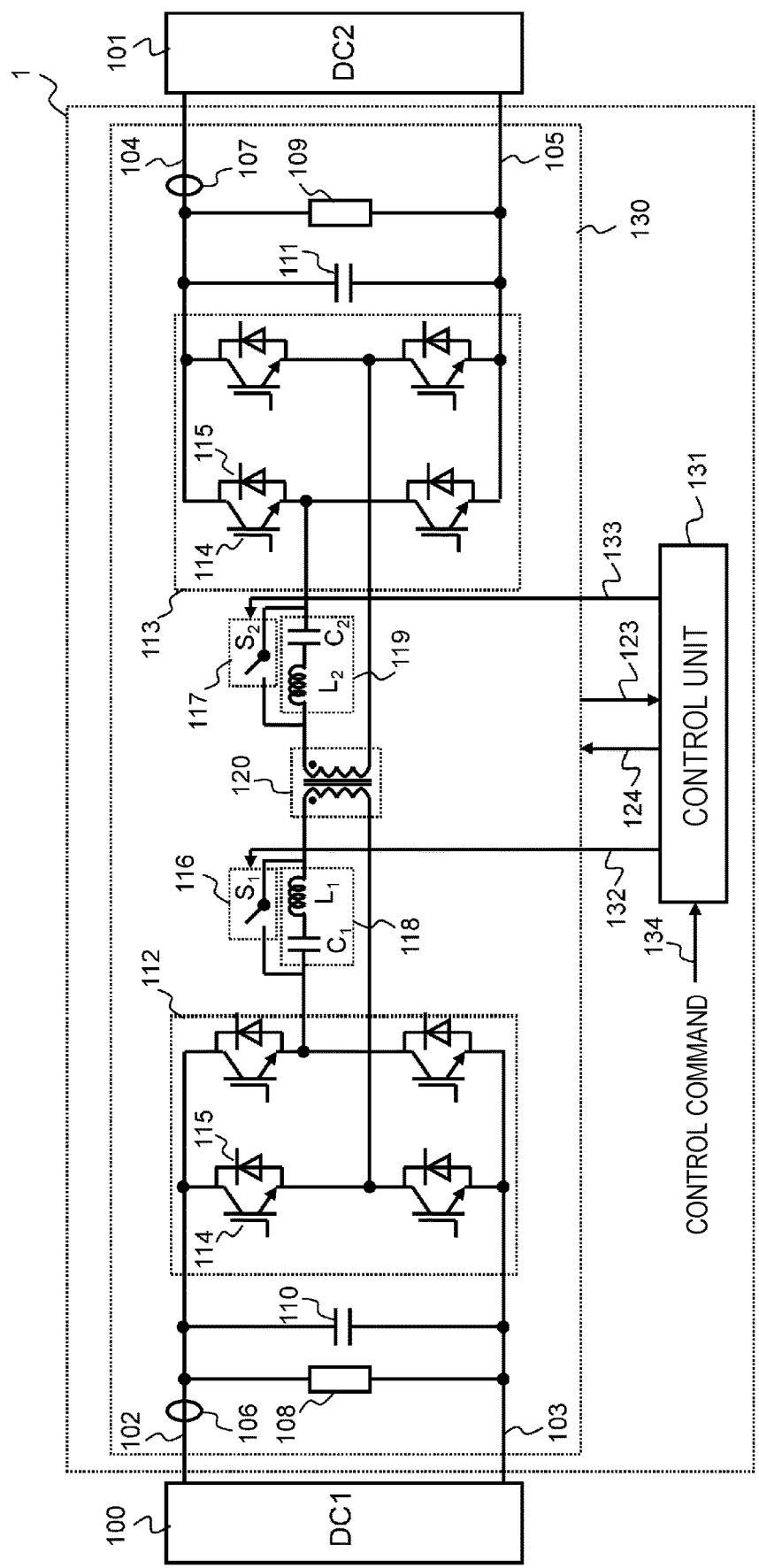
FIG. 1 is a schematic configuration diagram of a bidirectional DC-DC converter according to a first embodiment of the present invention.

FIG. 1 is a schematic configuration diagram of a bidirectional DC-DC converter according to a first embodiment of the present invention. A bidirectional DC-DC converter 1 illustrated in FIG. 1 is a DC-DC converter that is connected between a DC power supply 100 and a DC power supply 101 and is capable of converting DC power bidirectionally between the DC power supply 100 and the DC power supply 101. That is, in a case where power flows in a direction from the DC power supply 100 toward the DC power supply 101, the DC power output from the DC power supply 100 is converted in the bidirectional DC-DC converter 1 and is input to the DC power supply 101. In this case, the DC power supply 100 operates as a power source, and the DC power supply 101 operates as a load. Conversely, in a case where power flows in a direction from the DC power supply 101 toward the DC power supply 100, the DC power output from the DC power supply 101 is converted in the bidirectional DC-DC converter 1 and is input to the DC power supply 100. In this case, the DC power supply 101 operates as a power source, and the DC power supply 100 operates as a load.

The bidirectional DC-DC converter 1 includes a converter circuit unit 130 and a control unit 131. The converter circuit unit 130 is connected to the DC power supply 100 via a positive electrode terminal 102 and a negative electrode terminal 103, and is connected to the DC power supply 101 via a positive electrode terminal 104 and a negative electrode terminal 105. The converter circuit unit 130 includes current sensors 106 and 107, voltage sensors 108 and 109, smoothing capacitors 110 and 111, bridge circuits 112 and 113, bypass switches 116 and 117, resonant circuits 118 and 119, and a transformer 120.

The current sensor 106 is connected between the DC power supply 100 and the bridge circuit 112, and detects a current flowing through the DC power supply 100. The current sensor 107 is connected between the DC power supply 101 and the bridge circuit 113, and detects a current flowing through the DC power supply 101. The detection result of each current by these current sensors is output from the converter circuit unit 130 to the control unit 131 as a sensor signal 123.

The voltage sensor 108 detects a voltage of the DC power supply 100. The voltage sensor 109 detects a voltage of the DC power supply 101. The detection result of each voltage by these voltage sensors is output from the converter circuit unit 130 to the control unit 131 as the sensor signal 123.

The smoothing capacitor 110 is connected in parallel with the bridge circuit 112 with respect to the DC power supply 100, and smooths the DC power input and output between the DC power supply 100 and the bridge circuit 112. The smoothing capacitor 111 is connected in parallel with the bridge circuit 113 with respect to the DC power supply 101, and smooths the DC power input and output between the DC power supply 101 and the bridge circuit 113.

The bridge circuit 112 converts DC power and AC power to each other which are input and output between the DC power supply 100 and a primary side of the transformer 120. That is, in a case where power flows in the direction from the DC power supply 100 toward the DC power supply 101, the bridge circuit 112 converts the DC power output from the DC power supply 100 into AC power and outputs the AC power to the primary side of the transformer 120. Conversely, in a case where power flows in the direction from the DC power supply 101 toward the DC power supply 100, the bridge circuit 112 converts the AC power flowing through the primary side of the transformer 120 into DC power and outputs the DC power to the DC power supply 100.

The bridge circuit 113 converts DC power and AC power to each other which are input and output between the DC power supply 101 and a secondary side of the transformer 120. That is, in a case where power flows in the direction from the DC power supply 100 toward the DC power supply 101, the bridge circuit 113 converts the AC power flowing through the secondary side of the transformer 120 into DC power and outputs the DC power to the DC power supply 101. Conversely, in a case where power flows in the direction from the DC power supply 101 toward the DC power supply 100, the bridge circuit 113 converts the DC power output from the DC power supply 101 into AC power and outputs the AC power to the secondary side of the transformer 120.

The bridge circuits 112 and 113 are each constituted of a full bridge circuit including two legs, and each leg is configured by connecting two arms of parallel connection of a switching element 114 and a diode 115 in series. Note that FIG. 1 illustrates an example in which the bridge circuits 112 and 113 are full bridge circuits. However, as described later, the bridge circuits 112 and 113 may be realized by half bridge circuits including one leg.

Each of the switching elements 114 of the bridge circuits 112 and 113 operates in response to a gate control signal 124 input from the control unit 131, and is switched to either an on state or an off state. Each switching element 114 is constituted by using, for example, an insulated gate bipolar transistor (IGBT) or a metal-oxide-semiconductor field-effect transistor (MOSFET). Note that, in a case of the MOSFET, a body diode of each switching element 114 may be used as the diode 115.

FIG. 2 is a diagram illustrating a configuration example of the bridge circuits 112 and 113. FIG. 2(a) illustrates a configuration example in which the bridge circuits 112 and 113 are full bridge circuits, similarly to the example illustrated in FIG. 1. In the circuit configuration of FIG. 2(a), four switching elements 114 and four diodes 115 are arranged in each of the bridge circuits 112 and 113. On the other hand, FIG. 2(b) illustrates a configuration example in which the bridge circuits 112 and 113 are half bridge circuits. In the circuit configuration of FIG. 2(b), two switching elements 114 and two diodes 115 are arranged in each of the bridge circuits 112 and 113.

Returning to the description of FIG. 1, the high frequency transformer 120 is formed by winding each of a primary winding and a secondary winding around an iron core at a predetermined winding ratio, and performs voltage conversion of AC power according to the winding ratio between the primary side and the secondary side. Note that a multi-winding transformer 120 including a plurality of windings on each of the primary side and the secondary side may be used.

In a case where power flows in the direction from the DC power supply 100 toward the DC power supply 101, each of the switching elements 114 of the bridge circuit 112 operates at a predetermined cycle, whereby the DC power supplied from the DC power supply 100 is converted into AC power, and the AC power after the voltage conversion is transmitted from the primary side to the secondary side of the transformer 120. The AC power is rectified by each of the diodes 115 of the bridge circuit 113, converted into DC power, and the DC power is output to the DC power supply 101. Conversely, in a case where power flows in the direction from the DC power supply 101 toward the DC power supply 100, each of the switching elements 114 of the bridge circuit 113 operates at a predetermined cycle, whereby the DC power supplied from the DC power supply 101 is converted into AC power, and the AC power after the voltage conversion is transmitted from the secondary side to the primary side of the transformer 120. The AC power is rectified by each of the diodes 115 of the bridge circuit 112, converted into DC power, and the DC power is output to the DC power supply 100.

The resonant circuit 118 is provided on the primary side of the transformer 120, and is constituted by using a capacitor C1 and an inductor L1 connected in series. Note that the positions of the capacitor C1 and the inductor L1 may be interchanged. The bypass switch 116 is connected between both ends of the resonant circuit 118. The bypass switch 116 is constituted by using various relays, for example.

The bypass switch 116 and the resonant circuit 118 are each connected between the bridge circuit 112 and the primary side of the transformer 120. The bypass switch 116 and the resonant circuit 118 are connected in parallel to each other, and the connection state of the resonant circuit 118 between the bridge circuit 112 and the primary side of the transformer 120 is switched according to the switching state of the bypass switch 116. That is, in a case where the bypass switch 116 is switched to an open (off) state, the bridge circuit 112 and the primary side of the transformer 120 are connected via the resonant circuit 118, and an LC resonant circuit is formed on the primary side of the transformer 120. On the other hand, in a case where the bypass switch 116 is switched to a conductive (on) state, the bridge circuit 112 and the primary side of the transformer 120 are connected without the resonant circuit 118. The switching state of the bypass switch 116 is controlled in accordance with a switch control signal 132 input from the control unit 131.

The resonant circuit 119 is provided on the secondary side of the transformer 120, and is constituted by using a capacitor C2 and an inductor L2 connected in series. Note that the positions of the capacitor C2 and the inductor L2 may be interchanged. The bypass switch 117 is connected between both ends of the resonant circuit 119. The bypass switch 117 is constituted by using various relays, for example.

The bypass switch 117 and the resonant circuit 119 are each connected between the bridge circuit 113 and the secondary side of the transformer 120. The bypass switch 117 and the resonant circuit 119 are connected in parallel to each other, and the connection state of the resonant circuit 119 between the bridge circuit 113 and the secondary side of the transformer 120 is switched according to the switching state of the bypass switch 117. That is, in a case where the bypass switch 117 is switched to an open (off) state, the bridge circuit 113 and the secondary side of the transformer 120 are connected via the resonant circuit 119, and an LC resonant circuit is formed on the secondary side of the transformer 120. On the other hand, in a case where the bypass switch 117 is switched to a conductive (on) state, the bridge circuit 113 and the secondary side of the transformer 120 are connected without the resonant circuit 119. The switching state of the bypass switch 117 is controlled in accordance with a switch control signal 133 input from the control unit 131.

The control unit 131 performs predetermined arithmetic processing on the basis of the sensor signal 123 from each sensor and a control command 134 input from the outside to generate the gate control signal 124 and the switch control signals 132 and 133. Note that the control command 134 is input via an operation unit (not illustrated) by an operator who operates the system on which the bidirectional DC-DC converter 1 is mounted, for example. The control unit 131 outputs the generated gate control signal 124 to the bridge circuits 112 and 113, and outputs the switch control signals 132 and 133 to the bypass switches 116 and 117, respectively. As a result, the control unit 131 controls the operation of the bridge circuits 112 and 113 and controls the switching states of the bypass switches 116 and 117 to control the direction of the DC power input and output between the DC power supply 100 and the DC power supply 101 via the bidirectional DC-DC converter 1. The control unit 131 is constituted by using, for example, a microcomputer, and realizes desired arithmetic processing by executing a program stored in advance in a memory or the like. Note that the control unit 131 may be constituted by using a logic circuit such as a field programmable gate array (FPGA) or an application specific integrated circuit (ASIC) instead of the microcomputer or in combination with the microcomputer.

FIG. 3 is a table illustrating switching states of the bypass switches 116 and 117 controlled by the control unit 131 in the bidirectional DC-DC converter according to the first embodiment of the present invention. In the table in FIG. 3, columns 201 and 202 represent states of the switch control signals 132 and 133, respectively, and columns 203 and 204 represent switching states of the bypass switches 116 and 117, respectively. In addition, a column 205 represents operation mode (a direction in which power flows) of the bidirectional DC-DC converter 1.

In the bidirectional DC-DC converter 1 of the present embodiment, in a case where DC power flowing in the direction (forward direction) from the DC power supply 100 toward the DC power supply 101 is converted, as illustrated in the table in FIG. 3, the control unit 131 outputs the switch control signal 132 at "0", that is, at a low level, and outputs the switch control signal 133 at "1", that is, at a high level. As a result, the bypass switch 116 (S1) is switched to an open state, and the bypass switch 117 (S2) is switched to a conductive state. As a result, the resonant circuit 118 is connected between the bridge circuit 112 and the primary side of the transformer 120, and an LC resonant circuit is formed on the primary side of the transformer 120. The control unit 131 performs an operation of mode 1 by causing each of the switching elements 114 of the bridge circuit 112 to perform a switching operation so that power flows in the forward direction via the LC resonant circuit.

On the other hand, in a case where DC power flowing in the direction (reverse direction) from the DC power supply 101 toward the DC power supply 100 is converted, as illustrated in the table in FIG. 3, the control unit 131 outputs the switch control signal 132 at "1", that is, at a high level, and outputs the switch control signal 133 at "0", that is, at a low level. As a result, the bypass switch 116 (S1) is switched to a conductive state, and the bypass switch 117 (S2) is switched to an open state. As a result, the resonant circuit 119 is connected between the bridge circuit 113 and the secondary side of the transformer 120, and an LC resonant circuit is formed on the secondary side of the transformer 120. The control unit 131 performs an operation of mode 2 by causing each of the switching elements 114 of the bridge circuit 113 to perform a switching operation so that power flows in the reverse direction via the LC resonant circuit.

Figure 4:
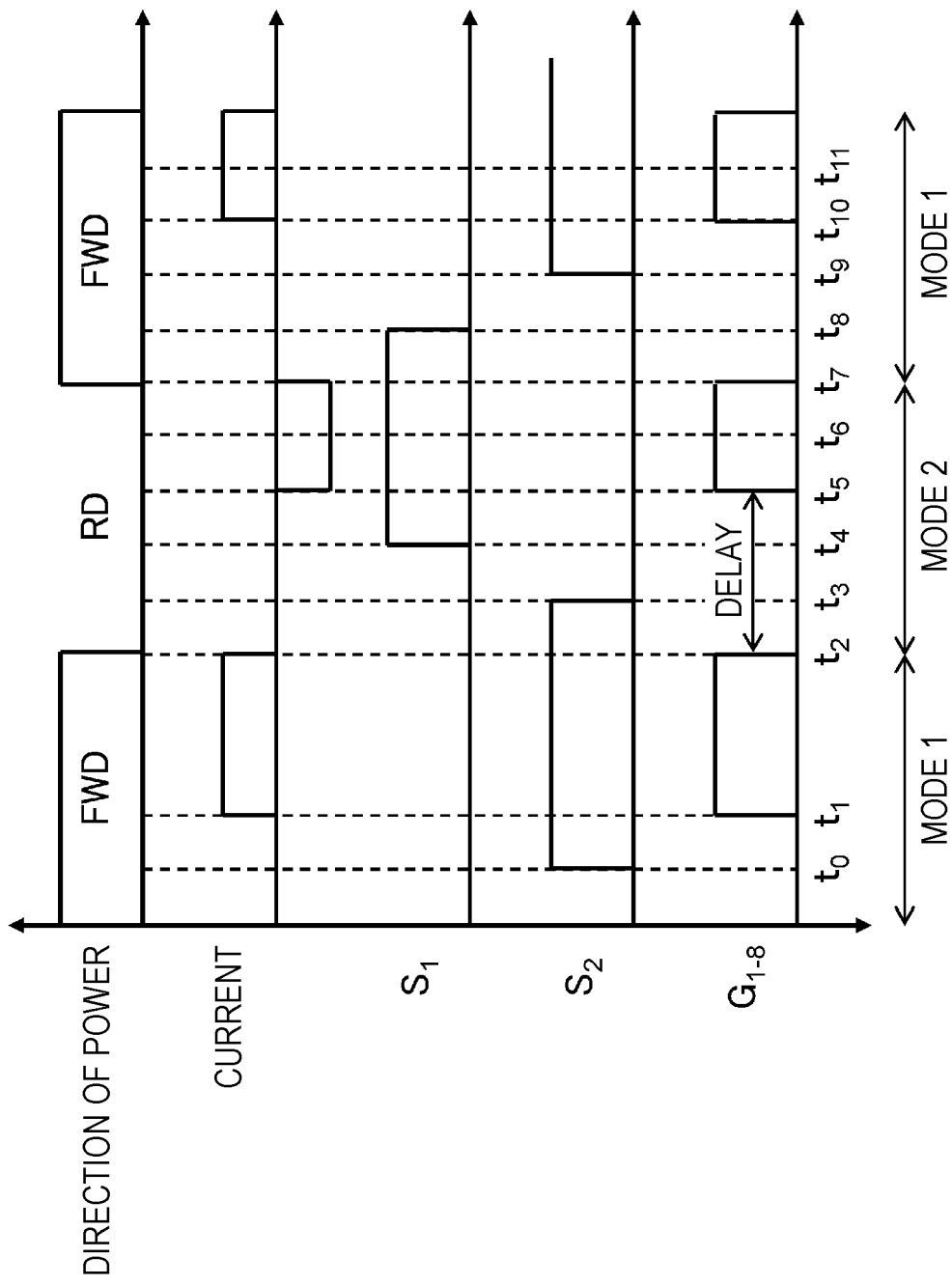
FIG. 4 is a diagram illustrating switching control of the bypass switches by the control unit.

FIG. 4 is a diagram illustrating switching control of the bypass switches 116 and 117 by the control unit 131. As illustrated in FIG. 4, the control unit 131 changes each of the switch control signals 132 and 133 at a predetermined timing to switch the bypass switches 116 (S1) and 117 (S2), and outputs the gate control signal 124 to the bridge circuits 112 and 113 to cause each of the switching elements 114 (G1 to G8) to perform the switching operation. As a result, in the bidirectional DC-DC converter 1, the operation of mode 1 in which power flows in the forward direction and the operation of mode 2 in which power flows in the reverse direction are alternately performed.

Specifically, for example, the control unit 131 outputs the switch control signals 132, 133, and the gate control signal 124 as follows. First, at a point of time at which the bidirectional DC-DC converter 1 is turned on, both the bypass switches 116 (S1) and 117 (S2) are in an open state. Thereafter, at a time point t0, the control unit 131 changes the switch control signal 133 from a low level to a high level to switch the bypass switch 117 to a conductive state. As a result, a state is brought about where the resonant circuit 118 is connected to the primary side of the transformer 120, and the resonant circuit 119 is not connected to the secondary side of the transformer 120.

Next, at a time point t1, the control unit 131 starts outputting the gate control signal 124 to each of the switching elements 114 of the bridge circuit 112. As a result, the bridge circuit 112 starts operation and the bidirectional DC-DC converter 1 operates in mode 1, so that power conversion from the primary side to the secondary side of the transformer 120 is performed. As a result, a current flows in the direction from the DC power supply 100 toward the DC power supply 101.

In a case of switching from mode 1 to mode 2, first, at a time point t2, the control unit 131 stops outputting the gate control signal 124 to each of the switching elements 114 of the bridge circuit 112. Then, when the power output from the bridge circuit 113 to the DC power supply 101 becomes less than a predetermined value, for example, less than 1 [W], at a time point t3, the control unit 131 changes the switch control signal 133 from a high level to a low level to switch the bypass switch 117 to an open state. Thereafter, at a time point t4, the control unit 131 changes the switch control signal 132 from a low level to a high level to switch the bypass switch 116 to a conductive state. As a result, a state is brought about where the resonant circuit 118 is not connected to the primary side of the transformer 120, and the resonant circuit 119 is connected to the secondary side of the transformer 120.

Next, at a time point t5, the control unit 131 starts outputting the gate control signal 124 to each of the switching elements 114 of the bridge circuit 113. As a result, the bridge circuit 113 starts operation and the bidirectional DC-DC converter 1 operates in mode 2, so that power conversion from the secondary side to the primary side of the transformer 120 is performed. As a result, a current flows in the direction from the DC power supply 101 toward the DC power supply 100. At this time, a delay corresponding to a period from the time point t2 to the time point t5 occurs in the output of the gate control signal 124 at the time of switching from mode 1 to mode 2.

Also in a case of switching from mode 2 to mode 1, control similar to that at the time of switching from mode 1 to mode 2 described above is performed. That is, first, at a time point t7, the control unit 131 stops outputting the gate control signal 124 to each of the switching elements 114 of the bridge circuit 113. Then, when the power output from the bridge circuit 112 to the DC power supply 100 becomes less than a predetermined value, at a time point t8, the control unit 131 changes the switch control signal 132 from a high level to a low level to switch the bypass switch 116 to an open state. Thereafter, at a time point t9, the control unit 131 changes the switch control signal 133 from a low level to a high level to switch the bypass switch 117 to a conductive state. As a result, similarly to the time point t0 described above, a state is brought about where the resonant circuit 118 is connected to the primary side of the transformer 120, and the resonant circuit 119 is not connected to the secondary side of the transformer 120. After switching the bypass switches 116 and 117 in this manner, at a time point t10, the control unit 131 starts outputting the gate control signal 124 to each of the switching elements 114 of the bridge circuit 112. As a result, the bridge circuit 112 starts operation and the bidirectional DC-DC converter 1 operates in mode 1, so that power conversion from the primary side to the secondary side of the transformer 120 is performed. As a result, a current flows in the direction from the DC power supply 100 toward the DC power supply 101.

As described above, the control unit 131 controls outputs of the switch control signals 132, 133, and the gate control signal 124. As a result, it is possible to suppress a rapid change in current and voltage in the bidirectional DC-DC converter 1 at the time of switching modes, and to protect each component in the bidirectional DC-DC converter 1.

Figure 5:
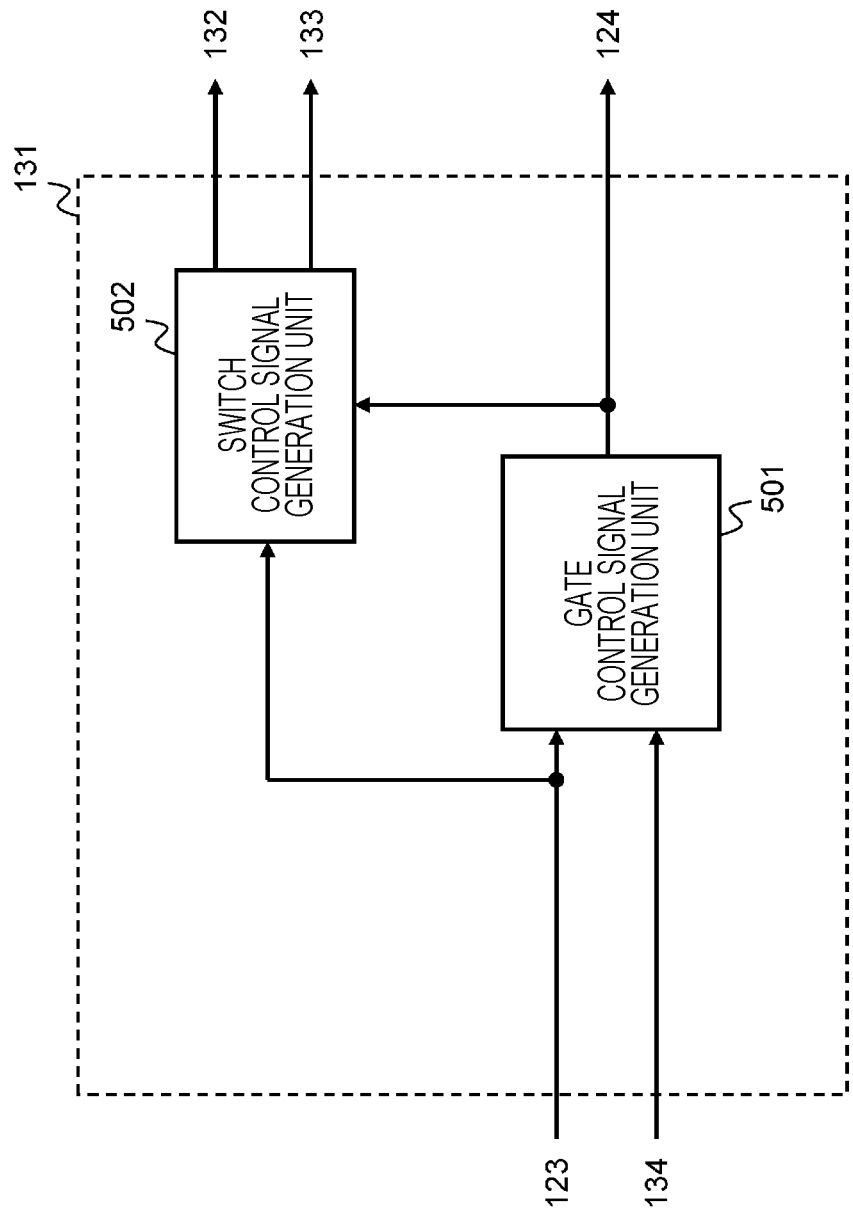
FIG. 5 is a functional configuration diagram of the control unit.

FIG. 5 is a functional configuration diagram of the control unit 131. The control unit 131 includes functional blocks of a gate control signal generation unit 501 and a switch control signal generation unit 502 as its functions. The control unit 131 realizes these functional blocks by executing a predetermined program, for example.

The gate control signal generation unit 501 generates the gate control signal 124 on the basis of voltages and currents of the DC power supplies 100 and 101 indicated by the sensor signal 123 from each sensor and the control command 134 input from the outside. At this time, the gate control signal generation unit 501 selects either mode 1 or mode 2 described above with reference to FIGS. 3 and 4 on the basis of the sensor signal 123 and the control command 134. Then, according to the control mode selected, the gate control signal generation unit 501 determines a direction in which power flows between the DC power supply 100 and the DC power supply 101, and generates the gate control signal 124 according to the direction.

The switch control signal generation unit 502 generates the switch control signals 132 and 133 on the basis of voltages and currents of the DC power supplies 100 and 101 indicated by the sensor signal 123 from each sensor and the gate control signal 124 generated by the gate control signal generation unit 501. Then, the switch control signal generation unit 502 controls the operation of the bypass switches 116 and 117 by outputting the generated switch control signals 132 and 133 to the bypass switches 116 and 117, respectively.

By the processing of each functional block described above, the control unit 131 determines the direction in which power flows between the DC power supply 100 and the DC power supply 101 on the basis of the currents of the DC power supplies 100 and 101 respectively detected by the current sensors 106 and 107, the voltages of the DC power supplies 100 and 101 respectively detected by the voltage sensors 108 and 109, and the control command 134 input from the outside, and generates the gate control signal 124 and the switch control signals 132 and 133.

Figure 6:
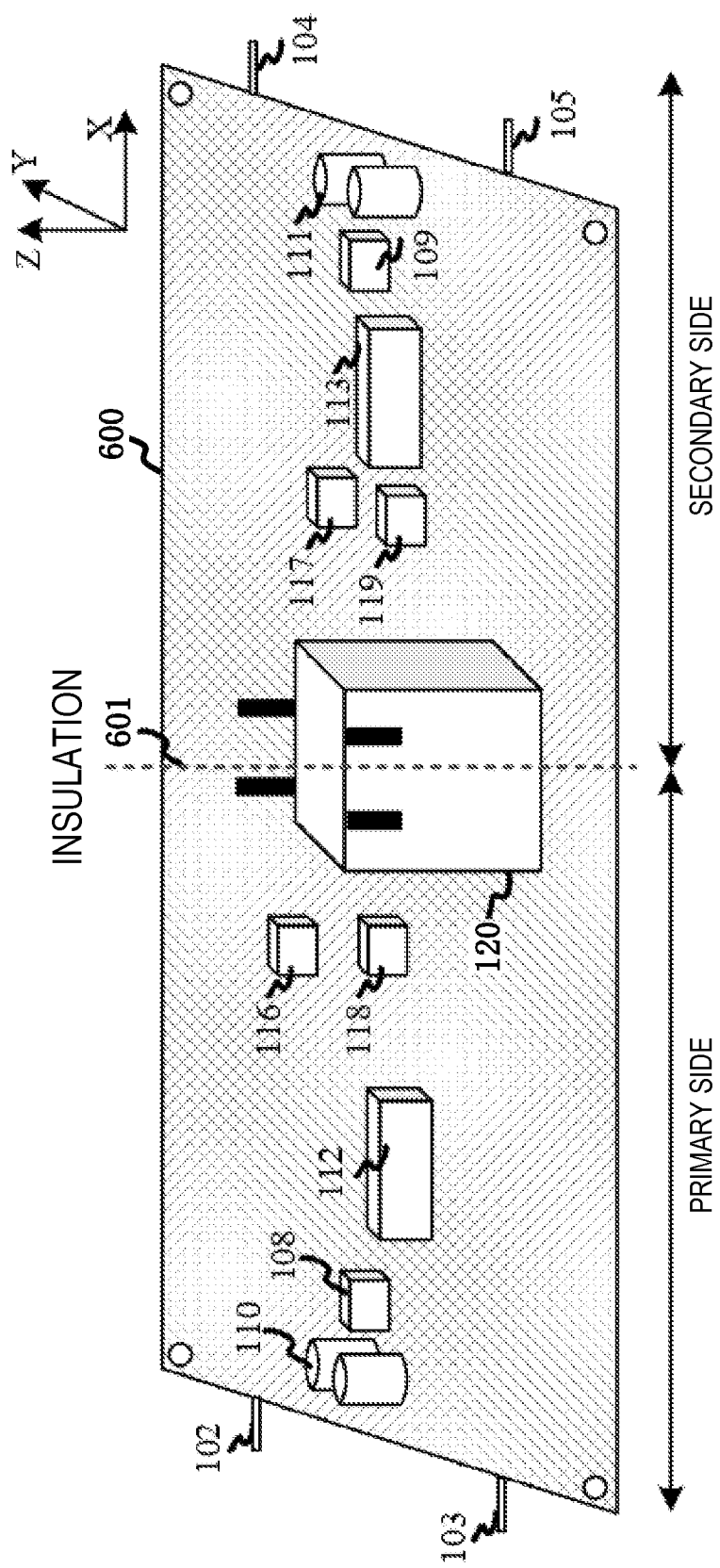
FIG. 6 is a diagram illustrating an arrangement example of each component in the bidirectional DC-DC converter.

FIG. 6 is a diagram illustrating an arrangement example of each component in the bidirectional DC-DC converter 1. In the arrangement example of FIG. 6, a circuit board 600 includes thereon each component of the converter circuit unit 130, that is, the voltage sensors 108 and 109, the smoothing capacitors 110 and 111, the bridge circuits 112 and 113, the bypass switches 116 and 117, the resonant circuits 118 and 119, and the transformer 120. Note that illustration of the current sensors 106 and 107 is omitted in FIG. 6.

The circuit board 600 is electrically separated into a primary side (input side) and a secondary side (output side) by an insulation boundary line 601 formed by the transformer 120.

Note that, in the circuit board 600 illustrated in FIG. 6, the bypass switches 116 and 117 and the resonant circuits 118 and 119 are all arranged on a single substrate, but can be mounted on separate substrates. For example, another substrate arranged parallel to the circuit board 600 at a predetermined interval from the circuit board 600 may be provided, and the bypass switches 116 and 117 may be mounted on the another substrate. In this manner, a mounting space for each component in the bidirectional DC-DC converter 1 can be reduced, and downsizing can be achieved.

According to the first embodiment of the present invention described above, the following operational effects are obtained.

(1) The bidirectional DC-DC converter 1 is a DC-DC converter capable of converting DC power bidirectionally between the DC power supply 100 and the DC power supply 101. The bidirectional DC-DC converter 1 includes the transformer 120, the bridge circuit 112 for converting DC power and AC power to each other which are input and output between the DC power supply 100 and the primary side of the transformer 120, the bridge circuit 113 for converting DC power and AC power to each other which are input and output between the DC power supply 101 and the secondary side of the transformer 120, the resonant circuit 118 connectable between the bridge circuit 112 and the primary side of the transformer 120, the resonant circuit 119 connectable between the bridge circuit 113 and the secondary side of the transformer 120, the bypass switch 116 for switching the connection state of the resonant circuit 118 between the bridge circuit 112 and the primary side of the transformer 120, the bypass switch 117 for switching the connection state of the resonant circuit 119 between the bridge circuit 113 and the secondary side of the transformer 120, and the control unit 131 for controlling each of the bypass switch 116 and the bypass switch 117. With such a configuration, an LC resonant circuit is formed on the primary side or the secondary side of the transformer 120 according to the direction of the DC power input and output between the DC power supply 100 and the DC power supply 101 via the bidirectional DC-DC converter 1, and the bidirectional DC-DC converter 1 capable of performing power conversion can be realized by using the LC resonant circuit. Therefore, the range of the output voltage is improved, so that a bidirectional DC-DC converter having high control stability can be provided.

(2) The resonant circuit 118 and the resonant circuit 119 are constituted by using the capacitors C1, C2 and the inductors L1, L2 connected in series, respectively. With such a configuration, an LC resonant circuit can be easily formed on the primary side or the secondary side of the transformer 120 by connecting the resonant circuit 118 or 119.

(3) The resonant circuit 118 is connected in parallel with the bypass switch 116 between the bridge circuit 112 and the primary side of the transformer 120. When the bypass switch 116 is opened by the control unit 131, the bridge circuit 112 and the primary side of the transformer 120 are connected via the resonant circuit 118, and when the bypass switch 116 is conducted by the control unit 131, the bridge circuit 112 and the primary side of the transformer 120 are connected without the resonant circuit 118. In addition, the resonant circuit 119 is connected in parallel with the bypass switch 117 between the bridge circuit 113 and the secondary side of the transformer 120. When the bypass switch 117 is opened by the control unit 131, the bridge circuit 113 and the secondary side of the transformer 120 are connected via the resonant circuit 119, and when the bypass switch 117 is conducted by the control unit 131, the bridge circuit 113 and the secondary side of the transformer 120 are connected without the resonant circuit 119. With such a configuration, the connection states of the resonant circuits 118 and 119 respectively between the bridge circuits 112, 113 and the transformer 120 can be reliably switched by using the bypass switches 116 and 117.

(4) In a case where the control unit 131 converts DC power flowing in the direction from the DC power supply 100 toward the DC power supply 101 (in a case of mode 1), the control unit 131 controls the bypass switch 116 and the bypass switch 117 so that the bypass switch 116 is opened and the bypass switch 117 is conducted. In addition, in a case where the control unit 131 converts DC power flowing in the direction from the DC power supply 101 toward the DC power supply 100 (in a case of mode 2), the control unit 131 controls the bypass switch 116 and the bypass switch 117 so that the bypass switch 116 is conducted and the bypass switch 117 is opened. With such a configuration, the switching control of the bypass switches 116 and 117 can be performed such that the connection states of the resonant circuits 118 and 119 respectively between the bridge circuits 112, 113 and the transformer 120 become appropriate according to the direction of the DC power input and output between the DC power supply 100 and the DC power supply 101 via the bidirectional DC-DC converter 1.

(5) The bidirectional DC-DC converter 1 includes the voltage sensor 108 that detects the voltage of the DC power supply 100, the current sensor 106 that detects the current flowing through the DC power supply 100, the voltage sensor 109 that detects the voltage of the DC power supply 101, and the current sensor 107 that detects the current flowing through the DC power supply 101. The control unit 131 controls the direction of the DC power between the DC power supply 100 and the DC power supply 101 on the basis of the voltages respectively detected by the voltage sensors 108 and 109, the currents respectively detected by the current sensors 106 and 107, and the control command 134 input from the outside. With such a configuration, the control unit 131 can appropriately control the direction of the DC power.

(6) The bypass switches 116 and 117 can each be constituted by using relays. In this manner, the bypass switches 116 and 117 having high environmental resistance and reliability can be realized at a low cost.

(7) The bridge circuits 112 and 113 are each constituted by using a half bridge circuit or a full bridge circuit. With such a configuration, the bridge circuits 112 and 113 can be realized by an arbitrary circuit configuration.

(8) After stopping the operation of the bridge circuit 112, the bidirectional DC-DC converter 1 starts the operation of the bridge circuit 113 when power output from the bridge circuit 112 becomes less than a predetermined value. In addition, after stopping the operation of the bridge circuit 113, the bidirectional DC-DC converter 1 starts the operation of the bridge circuit 112 when power output from the bridge circuit 113 becomes less than a predetermined value. With such a configuration, it is possible to suppress a rapid change in current and voltage in the bidirectional DC-DC converter 1, and to protect each component in the bidirectional DC-DC converter 1.

Second Embodiment

Figure 7:
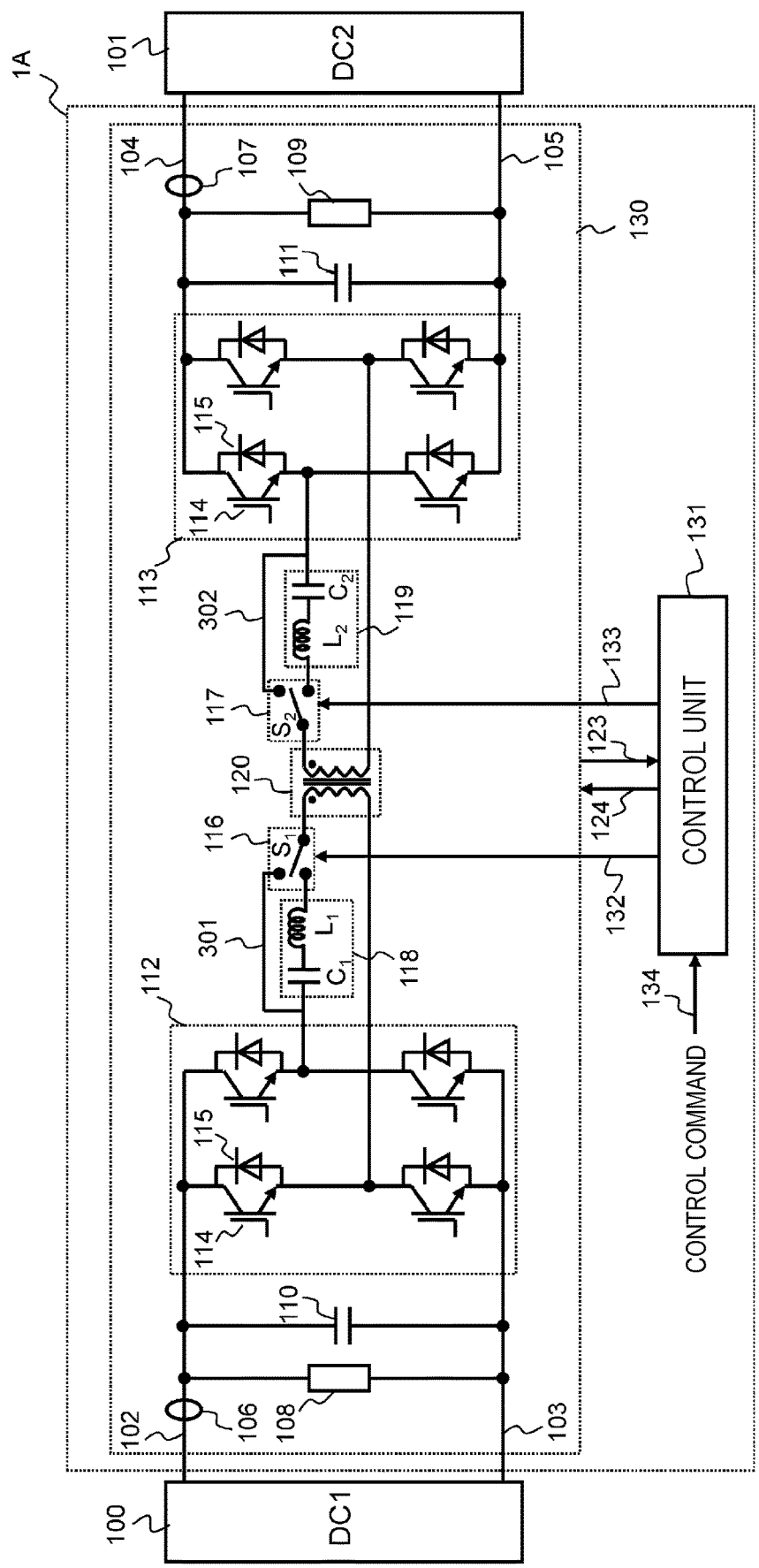
FIG. 7 is a schematic configuration diagram of a bidirectional DC-DC converter according to a second embodiment of the present invention.

FIG. 7 is a schematic configuration diagram of a bidirectional DC-DC converter according to a second embodiment of the present invention. Similarly to the bidirectional DC-DC converter 1 described in the first embodiment, a bidirectional DC-DC converter 1A illustrated in FIG. 7 is a DC-DC converter that is connected between the DC power supply 100 and the DC power supply 101 and is capable of converting DC power bidirectionally between the DC power supply 100 and the DC power supply 101.

The bidirectional DC-DC converter 1A of the present embodiment differs from the bidirectional DC-DC converter 1 of the first embodiment in that, in the converter circuit unit 130, bypass paths 301 and 302 are provided in parallel with the resonant circuits 118 and 119, respectively, and the bypass switches 116 and 117 are configured to be switchable between the resonant circuits 118, 119 and the bypass paths 301, 302, respectively. The bidirectional DC-DC converter 1 and the bidirectional DC-DC converter 1A are common in other respects.

In the bidirectional DC-DC converter 1A, the resonant circuit 118 and the bypass path 301 are each connected between the bridge circuit 112 and the primary side of the transformer 120 via the bypass switch 116. The bypass switch 116 switches the connection destination of the primary side of the transformer 120 to either the resonant circuit 118 or the bypass path 301 according to the switch control signal 132 output from the control unit 131. Similarly, the resonant circuit 119 and the bypass path 302 are each connected between the bridge circuit 113 and the secondary side of the transformer 120 via the bypass switch 117. The bypass switch 117 switches the connection destination of the secondary side of the transformer 120 to either the resonant circuit 119 or the bypass path 302. As a result, similarly to the first embodiment, an LC resonant circuit is formed on the primary side or the secondary side of the transformer 120 according to the direction of the DC power input and output between the DC power supply 100 and the DC power supply 101 via the bidirectional DC-DC converter 1A, and the bidirectional DC-DC converter 1A capable of performing power conversion is realized by using the LC resonant circuit.

FIG. 8 is a table illustrating switching states of the bypass switches 116 and 117 controlled by the control unit 131 in the bidirectional DC-DC converter according to the second embodiment of the present invention. In the table in FIG. 8, columns 211 and 212 represent states of the switch control signals 132 and 133, respectively, and columns 213 and 214 represent switching states of the bypass switches 116 and 117, respectively. In addition, a column 215 represents operation mode (the direction in which power flows) of the bidirectional DC-DC converter 1A.

In the bidirectional DC-DC converter 1A of the present embodiment, in a case where DC power flowing in the direction (forward direction) from the DC power supply 100 toward the DC power supply 101 is converted, as illustrated in the table in FIG. 8, the control unit 131 outputs the switch control signal 132 at "0", that is, at a low level, and outputs the switch control signal 133 at "1", that is, at a high level. As a result, the bypass switch 116 (S1) is switched to a state of being connected to a resonant circuit 118 side, and the bypass switch 117 (S2) is switched to a state of being connected to a bypass path 302 side. As a result, the resonant circuit 118 is connected between the bridge circuit 112 and the primary side of the transformer 120, and an LC resonant circuit is formed on the primary side of the transformer 120. The control unit 131 performs an operation of mode 1 by causing each of the switching elements 114 of the bridge circuit 112 to perform a switching operation so that power flows in the forward direction via the LC resonant circuit.

On the other hand, in a case where DC power flowing in the direction (reverse direction) from the DC power supply 101 toward the DC power supply 100 is converted, as illustrated in the table in FIG. 8, the control unit 131 outputs the switch control signal 132 at "1", that is, at a high level, and outputs the switch control signal 133 at "0", that is, at a low level. As a result, the bypass switch 116 (S1) is switched to a state of being connected to a bypass path 301 side, and the bypass switch 117 (S2) is switched to a state of being connected to a resonant circuit 119 side. As a result, the resonant circuit 119 is connected between the bridge circuit 113 and the secondary side of the transformer 120, and an LC resonant circuit is formed on the secondary side of the transformer 120. The control unit 131 performs an operation of mode 2 by causing each of the switching elements 114 of the bridge circuit 113 to perform a switching operation so that power flows in the reverse direction via the LC resonant circuit.

Note that, in the present embodiment, the control unit 131 controls the outputs of the switch control signals 132, 133, and the gate control signal 124 in accordance with a procedure similar to that in FIG. 4 described in the first embodiment. As a result, the operation of mode 1 in which power flows in the forward direction and the operation of mode 2 in which power flows in the reverse direction can be alternately performed.

According to the second embodiment of the present invention described above, the bidirectional DC-DC converter 1A includes the bypass path 301 provided in parallel with the resonant circuit 118. The resonant circuit 118 and the bypass path 301 are each connected between the bridge circuit 112 and the primary side of the transformer 120 via the bypass switch 116, and the bypass switch 116 switches the connection destination of the primary side of the transformer 120 to either the resonant circuit 118 or the bypass path 301. In addition, the bidirectional DC-DC converter 1A includes the bypass path 302 provided in parallel with the resonant circuit 119. The resonant circuit 119 and the bypass path 302 are each connected between the bridge circuit 113 and the secondary side of the transformer 120 via the bypass switch 117, and the bypass switch 117 switches the connection destination of the secondary side of the transformer 120 to either the resonant circuit 119 or the bypass path 302. With such a configuration, similarly to the first embodiment, the connection states of the resonant circuits 118 and 119 respectively between the bridge circuits 112, 113 and the transformer 120 can be reliably switched by using the bypass switches 116 and 117.

Furthermore, in a case where the control unit 131 converts DC power flowing in the direction from the DC power supply 100 toward the DC power supply 101 (in a case of mode 1), the control unit 131 controls the bypass switch 116 and the bypass switch 117 so that the connection destination of the primary side of the transformer 120 is switched to the resonant circuit 118 and the connection destination of the secondary side of the transformer 120 is switched to the bypass path 302. In addition, in a case where the control unit 131 converts DC power flowing in the direction from the DC power supply 101 toward the DC power supply 100 (in a case of mode 2), the control unit 131 controls the bypass switch 116 and the bypass switch 117 so that the connection destination of the primary side of the transformer 120 is switched to the bypass path 301 and the connection destination of the secondary side of the transformer 120 is switched to the resonant circuit 119. With such a configuration, similarly to the first embodiment, the switching control of the bypass switches 116 and 117 can be performed such that the connection states of the resonant circuits 118 and 119 respectively between the bridge circuits 112, 113 and the transformer 120 become appropriate according to the direction of the DC power input and output between the DC power supply 100 and the DC power supply 101 via the bidirectional DC-DC converter 1A.

Third Embodiment

Figure 9:
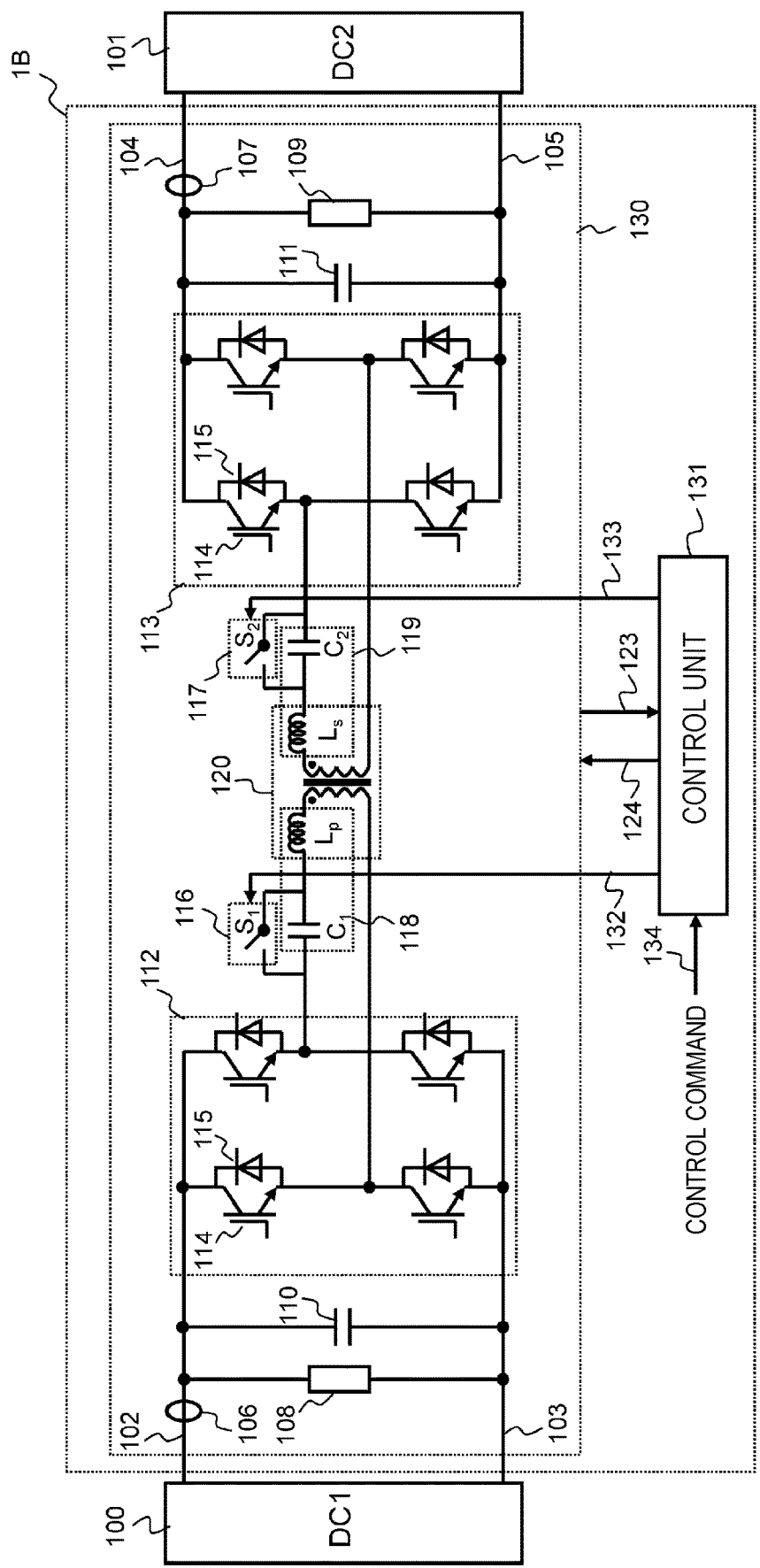
FIG. 9 is a schematic configuration diagram of a bidirectional DC-DC converter according to a third embodiment of the present invention.

FIG. 9 is a schematic configuration diagram of a bidirectional DC-DC converter according to a third embodiment of the present invention. Similarly to the bidirectional DC-DC converter 1 described in the first embodiment, a bidirectional DC-DC converter 1B illustrated in FIG. 9 is a DC-DC converter that is connected between the DC power supply 100 and the DC power supply 101 and is capable of converting DC power bidirectionally between the DC power supply 100 and the DC power supply 101.

The bidirectional DC-DC converter 1B of the present embodiment differs from the bidirectional DC-DC converter 1 of the first embodiment in that, in the converter circuit unit 130, the resonant circuits 118 and 119 do not include the inductors L1 and L2, respectively, and the resonant circuits 118 and 119 are constituted by using a leakage flux Lp existing on the primary side and a leakage flux Ls existing on the secondary side of the transformer 120, respectively, instead. The bidirectional DC-DC converter 1 and the bidirectional DC-DC converter 1B are common in other respects.

In the bidirectional DC-DC converter 1B, the capacitor C1 constituting the resonant circuit 118 is connected in parallel with the bypass switch 116 between the bridge circuit 112 and the primary side of the transformer 120. When the bypass switch 116 is opened by the control unit 131, the bridge circuit 112 and the primary side of the transformer 120 are connected via the capacitor C1, and an LC resonant circuit is formed on the primary side of the transformer 120 by the capacitor C1 and the leakage flux Lp of the transformer 120. On the other hand, when the bypass switch 116 is conducted by the control unit 131, the bridge circuit 112 and the primary side of the transformer 120 are connected without the capacitor C1. Accordingly, the LC resonant circuit is not formed on the primary side of the transformer 120.

In addition, the capacitor C2 constituting the resonant circuit 119 is connected in parallel with the bypass switch 117 between the bridge circuit 113 and the secondary side of the transformer 120. When the bypass switch 117 is opened by the control unit 131, the bridge circuit 113 and the secondary side of the transformer 120 are connected via the capacitor C2, and an LC resonant circuit is formed on the secondary side of the transformer 120 by the capacitor C2 and the leakage flux Ls of the transformer 120. On the other hand, when the bypass switch 117 is conducted by the control unit 131, the bridge circuit 113 and the secondary side of the transformer 120 are connected without the capacitor C2. Accordingly, the LC resonant circuit is not formed on the secondary side of the transformer 120.

Note that, in the present embodiment, the control unit 131 controls the outputs of the switch control signals 132, 133, and the gate control signal 124 in accordance with a procedure similar to that in FIG. 4 described in the first embodiment. As a result, the operation of mode 1 in which power flows in the forward direction and the operation of mode 2 in which power flows in the reverse direction can be alternately performed.

According to the third embodiment of the present invention described above, in the bidirectional DC-DC converter 1B, the resonant circuit 118 is constituted by using the leakage flux Lp on the primary side of the transformer 120 and the capacitor C1, and the resonant circuit 119 is constituted by using the leakage flux Ls on the secondary side of the transformer 120 and the capacitor C2. With such a configuration, the resonant circuits 118 and 119 can be constituted without using the inductors L1 and L2.

Fourth Embodiment

Figure 10:
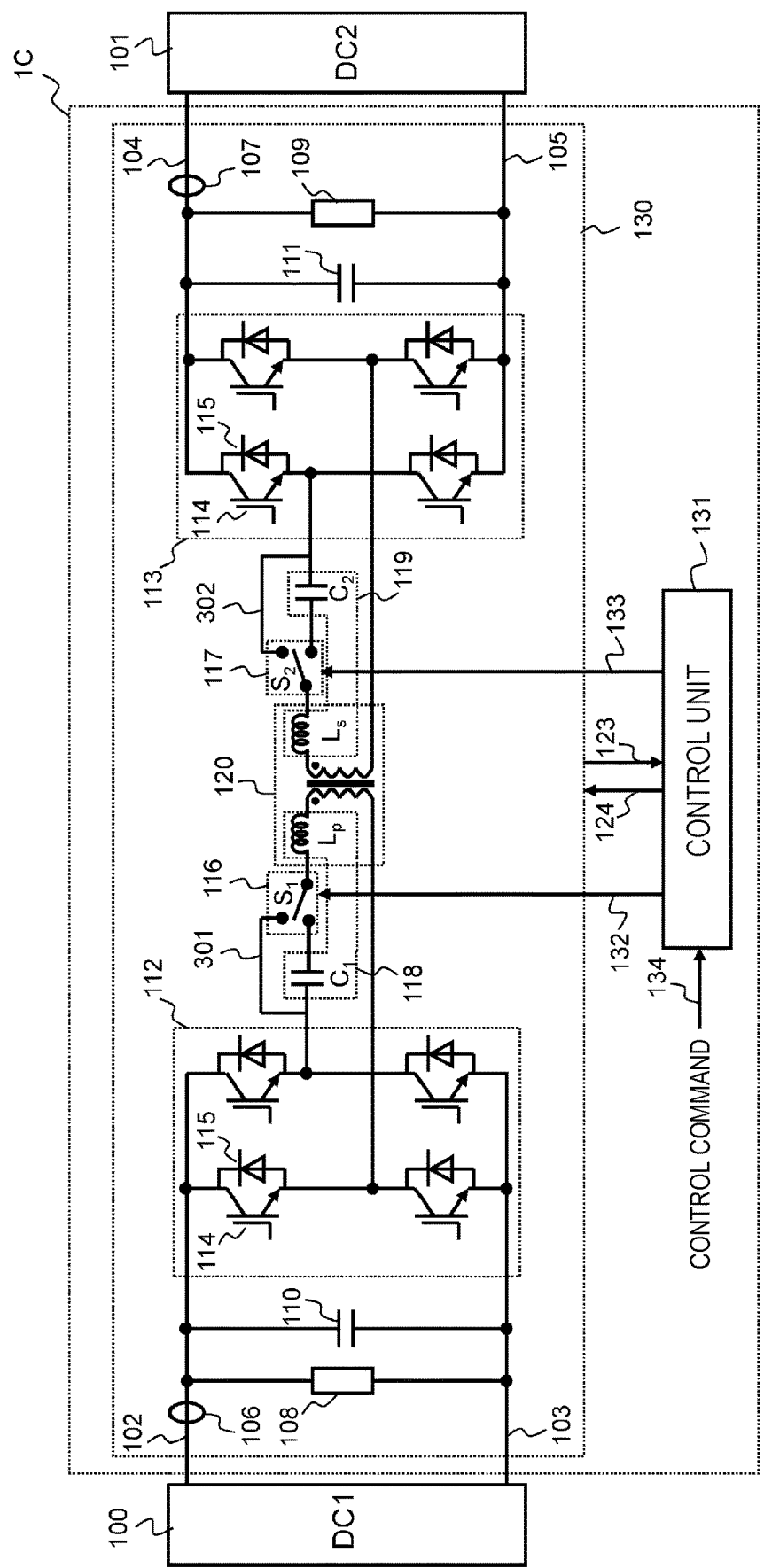
FIG. 10 is a schematic configuration diagram of a bidirectional DC-DC converter according to a fourth embodiment of the present invention.

FIG. 10 is a schematic configuration diagram of a bidirectional DC-DC converter according to a fourth embodiment of the present invention. Similarly to the bidirectional DC-DC converter 1 described in the first embodiment, a bidirectional DC-DC converter 1C illustrated in FIG. 10 is a DC-DC converter that is connected between the DC power supply 100 and the DC power supply 101 and is capable of converting DC power bidirectionally between the DC power supply 100 and the DC power supply 101.

In the bidirectional DC-DC converter 1C of the present embodiment, the features of the bidirectional DC-DC converters 1A and 1B respectively described in the second and third embodiments are combined. That is, in the converter circuit unit 130, the bypass paths 301 and 302 are provided in parallel with the capacitors C1 and C2 of the resonant circuits 118 and 119, respectively, and the bypass switches 116 and 117 are configured to be switchable between the capacitors C1, C2 and the bypass paths 301, 302, respectively. In addition, the resonant circuits 118 and 119 do not include the inductors L1 and L2, respectively, and the resonant circuits 118 and 119 are constituted by using the leakage flux Lp existing on the primary side and the leakage flux Ls existing on the secondary side of the transformer 120, respectively, instead.

Note that, in the present embodiment, the control unit 131 controls the outputs of the switch control signals 132, 133, and the gate control signal 124 in accordance with a procedure similar to that in FIG. 4 described in the first embodiment. As a result, the operation of mode 1 in which power flows in the forward direction and the operation of mode 2 in which power flows in the reverse direction can be alternately performed.

According to the fourth embodiment of the present invention described above, advantageous effects similar to those described in each of the first to third embodiments can be obtained.

Note that, in each of the first to fourth embodiments described above, one or both of the current sensors 106 and 107 may be provided between the bridge circuit 112, 113 and the transformer 120 instead of between the DC power supply 100, 101 and the bridge circuit 112, 113. Alternatively, the current sensor 106, 107 may be provided both between the DC power supply 100, 101 and the bridge circuit 112, 113 and between the bridge circuit 112, 113 and the transformer 120. In this manner, the current sensors 106 and 107 can detect a current flowing between the bridge circuit 112 and the primary side of the transformer 120 and a current flowing between the bridge circuit 113 and the secondary side of the transformer 120, respectively. Further, the control unit 131 generates the gate control signal 124 and the switch control signals 132 and 133 on the basis of the detection results of the currents, so that the direction of the DC power can be appropriately controlled.

The present invention is not limited to the above-described embodiments and modifications, and various modifications can be made without departing from the gist of the present invention. For example, the above embodiments are intended to describe the present invention in an easy-to-understand manner, and do not necessarily include all the constituent elements. Any constituent element can be added, deleted, or replaced without departing from the present invention.

REFERENCE SIGNS LIST 1, 1A, 1B, 1C bidirectional DC-DC converter
100, 101 DC power supply
102, 104 positive electrode terminal
103, 105 negative electrode terminal
106, 107 current sensor
108, 109 voltage sensor
110, 111 smoothing capacitor
112, 113 bridge circuit
114 switching element 115 diode
116, 117 bypass switch
118, 119 resonant circuit
120 transformer
123 sensor signal
124 gate control signal
130 converter circuit unit
131 control unit
132, 133 switch control signal
134 control command
301, 302 bypass path

The invention claimed is:

1. A bidirectional DC-DC converter that is a DC-DC converter capable of converting DC power bidirectionally between a first DC power supply and a second DC power supply, the bidirectional DC-DC converter comprising:
a transformer;
a first bridge circuit for converting DC power and AC power to each other which are input and output between the first DC power supply and a primary side of the transformer;
a second bridge circuit for converting DC power and AC power to each other which are input and output between the second DC power supply and a secondary side of the transformer;
a first resonant circuit connectable between the first bridge circuit and the primary side of the transformer;
a second resonant circuit connectable between the second bridge circuit and the secondary side of the transformer;
a first bypass switch for switching a connection state of the first resonant circuit between the first bridge circuit and the primary side of the transformer;
a second bypass switch for switching a connection state of the second resonant circuit between the second bridge circuit and the secondary side of the transformer;
a control unit for controlling each of the first bypass switch and the second bypass switch;
a first voltage sensor that detects a voltage of the first DC power supply;
a first current sensor that detects a current flowing through the first DC power supply and/or a current flowing between the first bridge circuit and the primary side of the transformer;
a second voltage sensor that detects a voltage of the second DC power supply; and
a second current sensor that detects a current flowing through the second DC power supply and/or a current flowing between the second bridge circuit and the secondary side of the transformer, wherein
the control unit controls a direction of the DC power on a basis of voltages respectively detected by the first voltage sensor and the second voltage sensor, currents respectively detected by the first current sensor and the second current sensor, and a control command input from an outside.

2. The bidirectional DC-DC converter according to claim 1, wherein
the first resonant circuit and the second resonant circuit are each constituted by using a capacitor and an inductor connected in series.

3. The bidirectional DC-DC converter according to claim 2, wherein
the first resonant circuit is connected in parallel with the first bypass switch between the first bridge circuit and the primary side of the transformer,
when the first bypass switch is opened by the control unit, the first bridge circuit and the primary side of the transformer are connected via the first resonant circuit, and
when the first bypass switch is conducted by the control unit, the first bridge circuit and the primary side of the transformer are connected without the first resonant circuit.

4. The bidirectional DC-DC converter according to claim 3, wherein
the second resonant circuit is connected in parallel with the second bypass switch between the second bridge circuit and the secondary side of the transformer,
when the second bypass switch is opened by the control unit, the second bridge circuit and the secondary side of the transformer are connected via the second resonant circuit, and
when the second bypass switch is conducted by the control unit, the second bridge circuit and the secondary side of the transformer are connected without the second resonant circuit.

5. The bidirectional DC-DC converter according to claim 4, wherein
the control unit controls,
in a case where the control unit converts DC power flowing in a direction from the first DC power supply toward the second DC power supply, the first bypass switch and the second bypass switch so that the first bypass switch is opened and the second bypass switch is conducted, and
in a case where the control unit converts DC power flowing in a direction from the second DC power supply toward the first DC power supply, the first bypass switch and the second bypass switch so that the first bypass switch is conducted and the second bypass switch is opened.

6. The bidirectional DC-DC converter according to claim 2, comprising
a first bypass path provided in parallel with the first resonant circuit, wherein
the first resonant circuit and the first bypass path are each connected between the first bridge circuit and the primary side of the transformer via the first bypass switch, and
the first bypass switch switches a connection destination of the primary side of the transformer to either the first resonant circuit or the first bypass path.

7. The bidirectional DC-DC converter according to claim 6, comprising
a second bypass path provided in parallel with the second resonant circuit, wherein
the second resonant circuit and the second bypass path are each connected between the second bridge circuit and the secondary side of the transformer via the second bypass switch, and
the second bypass switch switches a connection destination of the secondary side of the transformer to either the second resonant circuit or the second bypass path.

8. The bidirectional DC-DC converter according to claim 7, wherein
the control unit controls,
in a case where the control unit converts DC power flowing in a direction from the first DC power supply toward the second DC power supply, the first bypass switch and the second bypass switch so that the connection destination of the primary side of the transformer is switched to the first resonant circuit and the connection destination of the secondary side of the transformer is switched to the second bypass path, and in a case where the control unit converts DC power flowing in a direction from the second DC power supply toward the first DC power supply, the first bypass switch and the second bypass switch so that the connection destination of the primary side of the transformer is switched to the first bypass path and the connection destination of the secondary side of the transformer is switched to the second resonant circuit.

9. The bidirectional DC-DC converter according to claim 1, wherein the first resonant circuit is constituted by using a leakage flux on the primary side of the transformer and a first capacitor, and the second resonant circuit is constituted by using a leakage flux on the secondary side of the transformer and a second capacitor.

10. The bidirectional DC-DC converter according to claim 9, wherein the first capacitor is connected in parallel with the first bypass switch between the first bridge circuit and the primary side of the transformer, when the first bypass switch is opened by the control unit, the first bridge circuit and the primary side of the transformer are connected via the first capacitor, and when the first bypass switch is conducted by the control unit, the first bridge circuit and the primary side of the transformer are connected without the first capacitor.

11. The bidirectional DC-DC converter according to claim 10, wherein the second capacitor is connected in parallel with the second bypass switch between the second bridge circuit and the secondary side of the transformer, when the second bypass switch is opened by the control unit, the second bridge circuit and the secondary side of the transformer are connected via the second capacitor, and when the second bypass switch is conducted by the control unit, the second bridge circuit and the secondary side of the transformer are connected without the second capacitor.

12. The bidirectional DC-DC converter according to claim 9, comprising a first bypass path provided in parallel with the first capacitor, wherein the first capacitor and the first bypass path are each connected between the first bridge circuit and the primary side of the transformer via the first bypass switch, and the first bypass switch switches a connection destination of the primary side of the transformer to either the first capacitor or the first bypass path.

13. The bidirectional DC-DC converter according to claim 12, comprising a second bypass path provided in parallel with the second capacitor, wherein the second capacitor and the second bypass path are each connected between the second bridge circuit and the secondary side of the transformer via the second bypass switch, and the second bypass switch switches a connection destination of the secondary side of the transformer to either the second capacitor or the second bypass path.

14. The bidirectional DC-DC converter according to claim 13, wherein the control unit controls, in a case where the control unit converts DC power flowing in a direction from the first DC power supply toward the second DC power supply, the first bypass switch and the second bypass switch so that the connection destination of the primary side of the transformer is switched to the first capacitor and the connection destination of the secondary side of the transformer is switched to the second bypass path, and in a case where the control unit converts DC power flowing in a direction from the second DC power supply toward the first DC power supply, the first bypass switch and the second bypass switch so that the connection destination of the primary side of the transformer is switched to the first bypass path and the connection destination of the secondary side of the transformer is switched to the second capacitor.

15. The bidirectional DC-DC converter according to claim 1, wherein the first bypass switch and the second bypass switch are each constituted by using a relay.

16. The bidirectional DC-DC converter according to claim 1, wherein the first bridge circuit and the second bridge circuit are each constituted by using a half bridge circuit or a full bridge circuit.

17. The bidirectional DC-DC converter according to claim 1, wherein the first resonant circuit and the second resonant circuit are mounted on a first circuit board, the first bypass switch and the second bypass switch are mounted on a second circuit board, and the first circuit board and the second circuit board are arranged in parallel to each other at a predetermined interval.

18. The bidirectional DC-DC converter according to claim 1, wherein after stopping an operation of the first bridge circuit, an operation of the second bridge circuit is started when power output from the first bridge circuit becomes less than a predetermined value, and after stopping the operation of the second bridge circuit, an operation of the first bridge circuit is started when power output from the second bridge circuit becomes less than the predetermined value.

* * * * *